(12) United States Patent
Ohashi

(10) Patent No.: US 11,402,897 B2
(45) Date of Patent: Aug. 2, 2022

(54) POSITION ESTIMATION APPARATUS, POSITION ESTIMATION METHOD, AND PROGRAM

(71) Applicant: SONY INTERACTIVE ENTERTAINMENT INC., Tokyo (JP)

(72) Inventor: Yoshinori Ohashi, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/977,440

(22) PCT Filed: Oct. 5, 2018

(86) PCT No.: PCT/JP2018/037357
§ 371 (c)(1),
(2) Date: Sep. 1, 2020

(87) PCT Pub. No.: WO2019/176150
PCT Pub. Date: Sep. 19, 2019

(65) Prior Publication Data
US 2021/0004080 A1    Jan. 7, 2021

(30) Foreign Application Priority Data
Mar. 14, 2018    (WO) .................. PCT/JP2018/010014

(51) Int. Cl.
*G06F 3/01*        (2006.01)
*G06T 7/70*        (2017.01)
*G06F 3/0346*      (2013.01)

(52) U.S. Cl.
CPC ............ *G06F 3/012* (2013.01); *G06F 3/0346* (2013.01); *G06T 7/70* (2017.01)

(58) Field of Classification Search
CPC ......... G01B 11/00; G01B 21/00; G06F 3/012; G06F 3/0346; G06T 7/70; G06T 7/74; G06T 2207/10021
See application file for complete search history.

(56) References Cited

U.S. PATENT DOCUMENTS

2001/0029784 A1\* 10/2001 Kurachi ............. G01C 19/5719
                                                      73/504.04
2008/0119269 A1\*  5/2008 Nonaka ................... A63F 13/06
                                                         463/32
(Continued)

FOREIGN PATENT DOCUMENTS

JP        2008058102 A    3/2008
JP        2010133711 A    6/2010
(Continued)

OTHER PUBLICATIONS

International Search Report and Written Opinion dated Jun. 12, 2018, from the corresponding PCT/JP2018/010014, 9 sheets.
(Continued)

*Primary Examiner* — Mihir K Rayan
(74) *Attorney, Agent, or Firm* — Katten Muchin Rosenman LLP

(57) ABSTRACT

A position estimation apparatus, a position estimation method, and a program that can estimate a position of a tracker with high accuracy while the power consumption is reduced is provided. An estimation result storage section (50) stores a result of estimation of a position of a tracker (12). An acceleration data acquisition section (52) repeatedly acquires acceleration data indicative of an acceleration of the tracker (12) from a sensor that detects an acceleration of the tracker (12). An estimation result updating section (56) updates the result of estimation on the basis of the result of estimation of a position of the tracker stored in the estimation result storage section (50) and the acquired latest (Continued)

acceleration data. A velocity information acquisition section (54) acquires information of the velocity of the tracker (12). The estimation result updating section (56) updates, when the velocity information is acquired by the velocity information acquisition section (54), the estimation result of a position of the tracker (12) stored in the estimation result storage section (50) on the basis of the velocity information and the acquired latest acceleration data.

6 Claims, 4 Drawing Sheets

(56) References Cited

U.S. PATENT DOCUMENTS

| | | | | |
|---|---|---|---|---|
| 2009/0115724 | A1* | 5/2009 | Yamamoto | G06F 3/0346 345/158 |
| 2010/0141799 | A1* | 6/2010 | Yamashita | H04N 5/23248 348/E5.051 |
| 2013/0250047 | A1* | 9/2013 | Hollinger | H04N 7/183 348/36 |
| 2015/0279053 | A1 | 10/2015 | Lee et al. | |
| 2018/0070202 | A1* | 3/2018 | Mujibiya | H04W 4/02 |
| 2021/0141447 | A1* | 5/2021 | Bichler | G06F 3/012 |

FOREIGN PATENT DOCUMENTS

| | | |
|---|---|---|
| JP | 2014168171 A | 9/2014 |
| JP | 2014211404 A | 11/2014 |
| JP | 2016006415 A | 1/2016 |
| JP | 2017-119102 A | 7/2017 |

OTHER PUBLICATIONS

International Search Report and Written Opinion dated Nov. 6, 2018, from the corresponding PCT/JP2018/037357, 9 sheets.
Notice of Reasons for Refusal dated Aug. 17, 2021, from Japanese Patent Application No. 2020-506121, 3 sheets.
International Preliminary Report on Patentability dated Sep. 24, 2020, from PCT/JP2018/037357, 14 sheets.

* cited by examiner

| ESTIMATION BASIC DATA | ESTIMATION RESULT DATA |
|---|---|
| x0,v0,a(0) | x(8),v(8) |
| x(8),v(8),a(16) | x(16),v(16) |
| x(16),v(16),a(24) | x(24),v(24) |
| x(992),v(992),a(1000) | x(1000),v(1000) |
| xp(1000),v(1000),a(1008) | x(1008),v(1008) |
| x(1008),vp(1008),a(1016) | x(1016),v(1016) |
| x(1016),v(1016),a(1024) | x(1024),v(1024) |
| x(1992),v(1992),a(2000) | x(2000),v(2000) |
| xp(2000),v(2000),a(2008) | x(2008),v(2008) |
| x(2008),vp(2008),a(2016) | x(2016),v(2016) |
| x(2016),v(2016),a(2024) | x(2024),v(2024) |
| | |

POSITION ESTIMATION APPARATUS, POSITION ESTIMATION METHOD, AND PROGRAM

TECHNICAL FIELD

The present invention relates to a position estimation apparatus, a position estimation method, and a program.

BACKGROUND ART

A technology for estimating a position of a tracker mounted on a body of a user such as a head is known. The position of the tracker is estimated on the basis of a result of measurement by a sensor provided in the tracker such as, for example, a camera, an inertial sensor (IMU (Inertial Measurement Unit)), a geomagnetic sensor (orientation sensor), a motion sensor, or a GPS (Global Positioning System) module.

As an example of an estimation technology for the position of a tracker in which a camera is used, a technology of SLAM (Simultaneous Localization and Mapping) is known. In the SLAM technology, feature point data including a plurality of feature points is generated on the basis of sensing data acquired by the tracker such as an image captured, for example, by a camera provided in the tracker. Then, on the basis of a result of comparison between the generated feature point data and an environmental map that is a point cloud stored in advance, estimation of the position or the orientation of the tracker and updating of the environmental map are performed.

SUMMARY

Technical Problems

In the case where estimation of the position is performed on the basis of an image captured by a camera according to the SLAM technology, it is necessary to perform image processing, and therefore, high-power consumption is required.

On the other hand, for example, in the case where the position of the tracker is estimated on the basis of an acceleration that is a result of measurement of an inertial sensor provided in the tracker, an error due to double integration is accumulated, and consequently, as time passes after measurement is started, the estimation accuracy becomes degraded.

The present invention has been made in view of the subjects described above, and one of objects of the present invention is to provide a position estimation apparatus, a position estimation method, and a program that can estimate a position of a tracker with high accuracy while the power consumption is reduced.

Solution to Problems

In order to solve the above subjects, the position estimation apparatus according to the present invention includes an estimation result storage section configured to store a result of estimation of a position of a tracker, an acceleration data acquisition section configured to repeatedly acquire acceleration data indicative of an acceleration of the tracker from a sensor that detects an acceleration of the tracker, an estimation result updating section configured to update the result of estimation on the basis of the result of estimation of the position of the tracker stored in the estimation result storage section and the acquired latest acceleration data, and a velocity information acquisition section configured to acquire information of the velocity of the tracker. The estimation result updating section updates, when the velocity information is acquired by the velocity information acquisition section, the estimation result of a position of the tracker stored in the estimation result storage section on the basis of the velocity information and the acquired latest acceleration data.

In one mode of the present invention, the velocity information acquisition section acquires two images from a camera that captures the two images for each successively arriving capturing timing, and the estimation result updating section updates, when the two images are acquired by the velocity information acquisition section, the estimation result of a position of the tracker stored in the estimation result storage section on the basis of the velocity of the tracker estimated on the basis of the two images and the acquired latest acceleration data.

In this mode, the estimation result updating section updates, when the two images are acquired by the velocity information acquisition section, the estimation result of a position of the tracker stored in the estimation result storage section on the basis of a position of the tracker estimated based on at least one of the two images and the acquired latest acceleration data.

Further, in the one mode of the present invention, the position estimation apparatus further includes a reliability determination section configured to determine a reliability degree of the velocity information to be acquired by the velocity information acquisition section, and an acquisition controlling section configured to control the number of times at which the velocity information acquisition section is to acquire the velocity information per unit time on the basis of the reliability degree.

Further, in the one mode of the present invention, the sensor further detects an angular velocity of the tracker, and the velocity information acquisition section acquires the velocity information according to the angular velocity of the tracker detected by the sensor.

Meanwhile, the position estimation method according to the present invention includes an acceleration data acquisition step of repeatedly acquiring acceleration data indicative of an acceleration of a tracker from a sensor that detects an acceleration of the tracker, an estimation result updating step of updating a result of estimation on the basis of a result of estimation of a position of the tracker stored in an estimation result storage section that stores a result of estimation of the position of the tracker therein and the acquired latest acceleration data, and a velocity information acquisition step of acquiring information of a velocity of the tracker. When the velocity information is acquired in the velocity information acquisition step, in the estimation result updating step, an estimation result of a position of the tracker stored in the estimation result storage section on the basis of the velocity information and the acquired latest acceleration data.

Further, the program according to the present invention causes a computer to execute an acceleration data acquisition procedure of repeatedly acquiring acceleration data indicative of an acceleration of a tracker from a sensor that detects an acceleration of the tracker, an estimation result updating procedure of updating a result of estimation on the basis of a result of estimation of a position of the tracker stored in an estimation result storage section that stores a result of estimation of the position of the tracker therein and the acquired latest acceleration data, and a velocity information acquisition procedure of acquiring information of a velocity of the tracker. When the velocity information is acquired in the velocity information acquisition procedure, in the estimation result updating procedure, an estimation result of a position of the tracker stored in the estimation result storage section on the basis of the velocity information and the acquired latest acceleration data.

DESCRIPTION OF EMBODIMENT

In the following, an embodiment of the present invention is described in detail with reference to the drawings.

Figure 1:
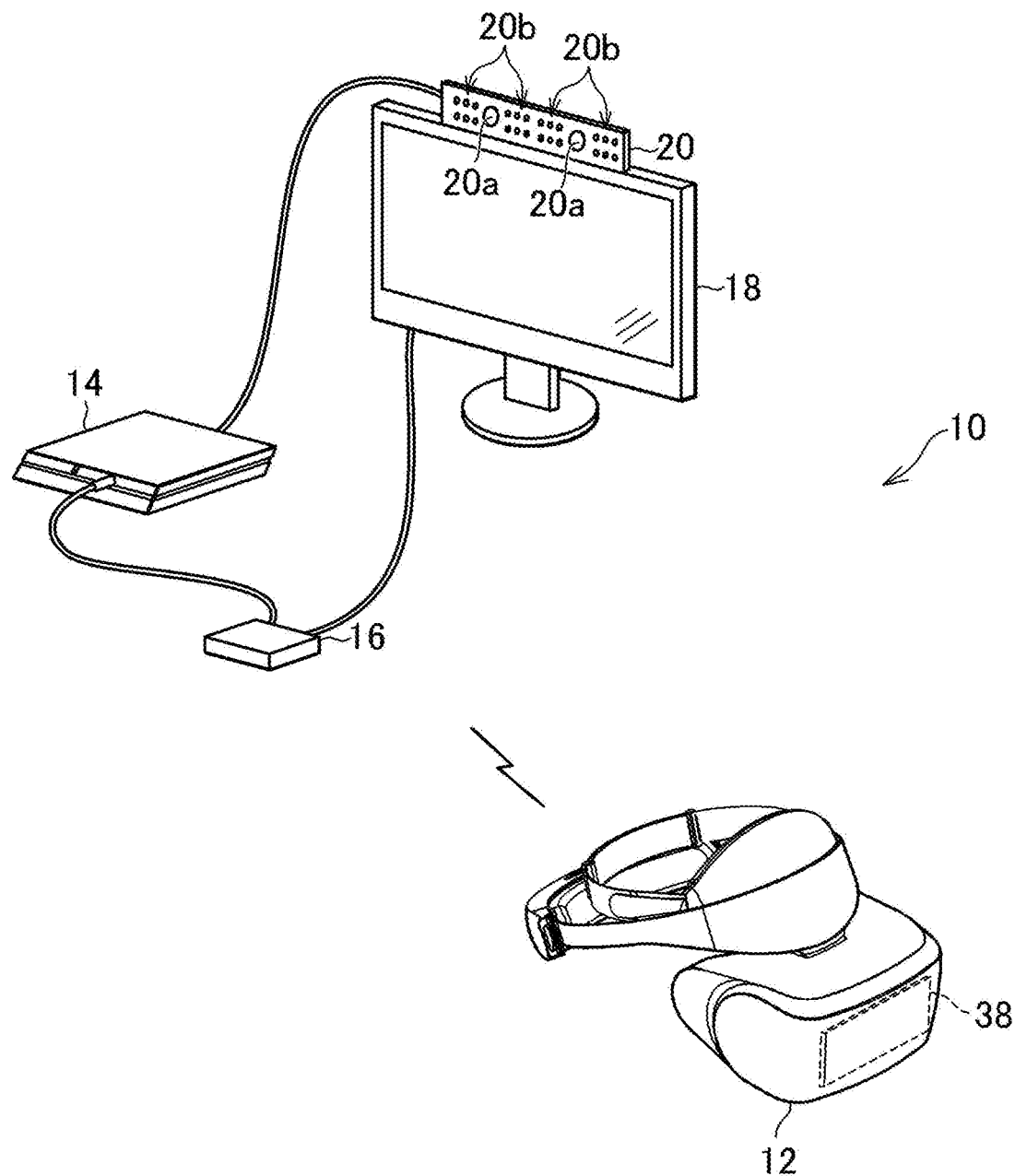
FIG. 1 is a configuration diagram depicting an example of an entertainment system according to an embodiment of the present invention.

FIG. 1 is a configuration diagram depicting an example of an entertainment system 10 according to the embodiment of the present invention. As depicted in FIG. 1, the entertainment system 10 according to the present embodiment includes a tracker 12, an entertainment apparatus 14, a relay apparatus 16, a display 18, and a camera and microphone unit 20.

The tracker 12 according to the present embodiment is an apparatus that tracks, in the present embodiment, for example, a position or an orientation of a user who wears the tracker 12. In FIG. 1, a head-mounted display (HMD) is depicted as an example of the tracker 12.

Figures 2, 3:
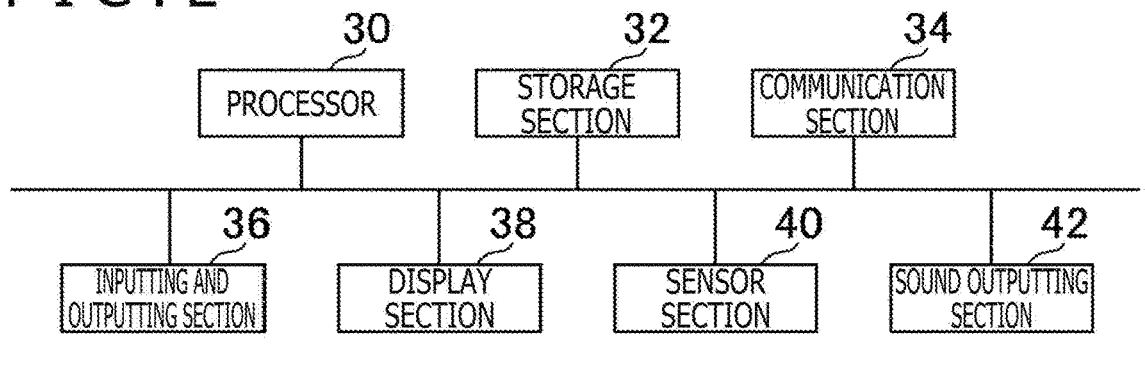
FIG. 2 is a configuration diagram depicting an example of a tracker according to the embodiment of the present invention.
FIG. 3 is a view depicting an example of a relationship between estimation basic data and estimation result data.

As depicted in FIG. 2, the tracker 12 according to the present embodiment includes a processor 30, a storage section 32, a communication section 34, an inputting and outputting section 36, a display section 38, a sensor section 40, and a sound outputting section 42.

The processor 30 is, for example, a program-controlled device such as a microprocessor that operates in accordance with a program installed in the tracker 12.

The storage section 32 is a storage element such as, for example, a ROM (Read-Only Memory) or a RAM (Random Access Memory). The storage section 32 stores programs executed by the processor 30 and so forth.

The communication section 34 is a communication interface such as, for example, a wireless LAN (Local Area Network) module.

The inputting and outputting section 36 is an input/output port such as, for example, an HDMI (registered trademark) (High-Definition Multimedia Interface) port, a USB (Universal Serial Bus) port, or an AUX (Auxiliary) port.

The display section 38 is a display arranged on a front side of the tracker 12 such as, for example, a liquid crystal display or an organic EL (Electroluminescence) display. Further, the display section 38 is accommodated in a housing of the tracker 12. The display section 38 according to the present embodiment can display a three-dimensional image by displaying, for example, an image for the left eye and an image for the right eye. It is to be noted that the display section 38 may be of the type that cannot display a three-dimensional image but can display only a two-dimensional image.

The sensor section 40 includes sensors such as, for example, a camera, an inertial sensor (IMU), a geomagnetic sensor (orientation sensor), and a GPS module. The camera included in the sensor section 40 captures an image, for example, at a predetermined frame rate. Further, the geomagnetic sensor included in the sensor section 40 outputs data indicative of an orientation in which the tracker 12 is directed at a predetermined frame rate to the processor 30. Further, the inertial sensor included in the sensor section 40 outputs data indicative of an acceleration or an angular velocity of the tracker 12 at a predetermined frame rate to the processor 30. Further, the GPS module included in the sensor section 40 outputs data indicative of a latitude and a longitude of the tracker 12 at a predetermined frame rate to the processor 30.

The sound outputting section 42 is, for example, a headphone, a speaker or the like and outputs sound represented by sound data and so forth.

The entertainment apparatus 14 according to the present embodiment is a computer such as, for example, a game console, a DVD (Digital Versatile Disc) player, or a Blu-ray (registered trademark) player. The entertainment apparatus 14 according to the present embodiment generates a video and an audio, for example, by execution of a game program or reproduction of a content stored therein or recorded on an optical disk. Then, the entertainment apparatus 14 according to the present embodiment outputs a video signal representative of a video to be generated and an audio signal representative of an audio to be generated to the display 18 through the relay apparatus 16. The entertainment apparatus 14 according to the present embodiment includes, for example, a processor, a storage element such as a ROM and a RAM, a hard disk drive, a communication interface such as a wireless LAN module, input/output ports and so forth.

The relay apparatus 16 according to the present embodiment is a computer that relays a video signal and an audio signal outputted from the entertainment apparatus 14 and outputs the signals to the display 18.

The display 18 according to the present embodiment is, for example, a liquid crystal display and displays a video represented by a video signal to be outputted from the entertainment apparatus 14.

The camera and microphone unit 20 according to the present embodiment includes a camera 20a that outputs, for example, an image obtained by imaging an imaging target to the entertainment apparatus 14 and a microphone 20b that acquires surrounding sound, converts the sound into sound data and outputs the sound data to the entertainment apparatus 14. Further, the camera 20a according to the present embodiment is a stereo camera.

The tracker 12 and the relay apparatus 16 can communicate data with each other, for example, by wireless communication. The entertainment apparatus 14 and the relay apparatus 16 are connected to each other, for example, through an HDMI cable or a USB cable such that they can communicate data with each other. The relay apparatus 16 and the display 18 are connected to each other, for example, through an HDMI cable or a like cable. The entertainment apparatus 14 and the camera and microphone unit 20 are connected to each other, for example, through an AUX cable or a like cable.

In the present embodiment, for example, when a game program is executed by the entertainment apparatus 14, various processes such as game processes according to a position, a posture, a movement and so forth of the tracker 12 are executed. Then, a video according to a result of the processes is displayed on the display 18 or the display section 38.

Further, in the present embodiment, the position of the tracker 12 is estimated on the basis an image captured by the camera included in the sensor section 40 of the tracker 12 and an acceleration of the tracker 12 measured by the inertial sensor included in the sensor section 40.

FIG. 3 is a view depicting an example of a relationship between estimation basic data on which estimation of the position of the tracker 12 is based and estimation result data indicative of a result of estimation based on the estimation basic data.

In the present embodiment, it is assumed that estimation of the position of the tracker 12 is performed after every 8 milliseconds. Further, it is assumed that also measurement of the acceleration by the inertial sensor included in the sensor section 40 is performed after every 8 milliseconds.

Further, in the example of FIG. 3, an initial value of the position of the tracker 12 is represented by x0 and an initial value of the velocity is represented by v0. Further, a value indicative of a result of estimation of the position and a value indicative of a result of estimation of the velocity when the elapsed time after estimation is started is t milliseconds are represented by x(t) and v(t), respectively. Further, a value indicative of a result of measurement of the acceleration by the inertial sensor in the case where the elapsed time after start of estimation is t is represented by a(t).

In the present embodiment, estimation of the position and the velocity of the tracker 12 based on a result of measurement of the acceleration by the inertial sensor is performed at intervals of 8 milliseconds. In FIG. 3, estimation basic data including a combination of a value x0, a value v0, and a value a(8) and estimation result data including a combination of a value x(8) and a value v(8) are depicted in an associated relationship with each other. This signifies that, on the basis of the estimation basic data including the combination of the value x0, the value v0, and the value a(8), the estimation result data including the combination with the value x(8) and the value v(8) is generated. It is to be noted that the value x(8) indicative of a position and the value v(8) indicative of a velocity can be specified uniquely on the basis of the value x0 indicative of a position, the value v0 indicative of a velocity, and the value a(8) indicative of an acceleration. Then, in the present embodiment, the estimation result data generated in this manner is retained.

Then, in the present embodiment, estimation result data including a combination of a value x(16) and a value v(16) are generated on the basis of estimation basic data including a combination of the value x(8) and the value (8) included in the retained estimation result data and a value a(16) indicative of a result of the measurement of the acceleration. It is to be noted that the value x(16) indicative of a position and the value v(16) indicative of a velocity can be specified uniquely on the basis of the value x(8) indicative of a position, the value v(8) indicative of a velocity, and the value a(16) indicative of an acceleration.

Further, estimation result data including a combination of a value x(32) and a value v(32) are generated on the basis of the estimation basic data including a combination of the value x(16) and the value v(16) included in the retained estimation result data and a value a(32) indicative of a measurement result of the acceleration. It is to be noted that the value x(32) indicative of a position and the value v(32) indicative of a velocity can be specified uniquely on the basis of the value x(16) indicative of a position, the value v(16) indicative of a velocity, and the value a(32) indicative of an acceleration.

As described above, in the present embodiment, estimation result data generated by estimation at a certain timing are used in principle as estimation basic data in estimation at a next timing.

Further, in the present embodiment, for example, the camera included in the sensor section 40 captures two images at imaging timings coming sequentially. Here, for example, the imaging timings come at intervals of one second (1000 milliseconds).

Further, it is assumed here that, for example, every timing an imaging timing comes, the camera captures two images at intervals of 8 milliseconds. For example, it is assumed that the imaging timing is a timing at which the elapsed time after estimation is started is 1000 milliseconds. In this case, at each of the timing at which the elapsed time after start of estimation is 1000 milliseconds and the timing at which the elapsed time is 1008 milliseconds, the camera included in the sensor section 40 captures images one by one.

Then, in the present embodiment, when an imaging timing comes and capturing of an image by the camera is performed, the position and the velocity of the tracker 12 are estimated on the basis of the captured images using the SLAM technology. When such estimation of the position and the velocity of the tracker 12 based on the images is performed, an estimation result of the position and the velocity of the tracker 12 based on the images is used as the estimation basic data in place of the retained estimation result data.

In the example of FIG. 3, a value indicative of the estimation result of the position of the tracker 12 based on the image captured at a timing at which the elapsed time after start of estimation is t milliseconds is indicated by xp(t). Meanwhile, a value indicative of the estimation result of the position of the tracker 12 based on the image captured at the timing at which the elapsed time after start of estimation is (t-8) milliseconds and the image captured at the timing at which the elapsed time is t milliseconds is indicated by vp(t).

Then, as depicted in FIG. 3, in the present embodiment, estimation result data including a combination of a value x(1008) and a value v(1008) are generated on the basis of estimation basic data including a combination of a value xp(1000), a value v(1000), and a value a(1008). In this example, the value xp(1000) indicative of an estimation result of the position based on the image are included in estimation basic data in place of the value x(1000) included in the retained estimation result data. It is to be noted that the value x(1008) indicative of a position and the value v(1008) indicative of a velocity can be specified uniquely on the basis of the value xp(1000) indicative of a position, the value v(1000) indicative of a velocity and the value a(1008) indicative of an acceleration.

Further, estimation result data including a combination of a value x(1016) and a value v(1016) are generated on the basis of estimation basic data including a combination of a value x(1008), a value vp(1008), and a value a(1016). In this example, the value vp(1008) indicative of an estimation result of the velocity based on the image is included in estimation basic data in place of the value v(1008) included in the retained estimation result data. It is to be noted that value x(1016) indicative of a position and the value v(1016) indicative of a velocity can be specified uniquely on the basis of the value x(1008) indicative of a position, the value vp(1008) indicative of a velocity, and the value a(1016) indicative of an acceleration.

Similarly, in the present embodiment, estimation result data including a combination of a value x(2008) and a value v(2008) are generated on the basis of estimation basic data including a combination of a value xp(2000), a value v(2000), and a value a(2008). Further, estimation result data including a combination of a value x(1016) and a value v(1016) is generated on the basis of estimation basic data including a combination of the value x(2008), the value vp(2008), and the value a(2008). Here, the value x(2008) indicative of a position and the value v(2008) indicative of a velocity can be specified uniquely on the basis of the value xp(2000) indicative of a position, the value v(2000) indicative of a velocity, and the value a(2008) indicative of an acceleration. Further, the value x(2016) indicative of a position and the value v(2016) indicative of a velocity can be specified uniquely on the basis of the value x(2008) indicative of a position, the value vp(2008) indicative of a velocity, and the value a(2016) indicative of an acceleration.

It is to be noted that each of estimation results of a position and a velocity and a measurement result of an acceleration may be a value represented, for example, three-dimensional coordinate values.

Alternatively, estimation of the position and the velocity of the tracker 12 based on a measurement result of the acceleration by the inertial sensor may be performed at time intervals shorter than the interval of 8 milliseconds. For example, estimation of the position and the velocity of the tracker 12 based on a measurement result of the acceleration by the inertial sensor may be performed at time intervals of 2 milliseconds.

Further, the timing at which an estimation result of the position based on the image is used as estimation basic data and the timing at which an estimation result of the velocity based on the image is used as estimation basic data may be same as each other. For example, it is assumed that the value indicative of the estimation result of the position based on the image captured at a timing at which the elapsed time after start of estimation is 1008 milliseconds is xp(1008). In this case, estimation result data including a combination of a value x(1016) and a value v(1016) may be generated on the basis of estimation basic data including a combination of a value xp(1008), a value vp(1008), and a value a(1016).

In the case where estimation of the position of the tracker 12 is performed on the basis of an image captured by the camera according to a technology such as the SLAM technology, since it is necessary to perform image processing, high-power consumption is required. Especially, in the case where estimation of the position of the tracker 12 based on an image is to be performed at such short time intervals as, for example, 8 milliseconds intervals, there is the possibility that considerably high-power consumption is required.

On the other hand, in the case where the position of the tracker 12 is estimated on the basis of a measurement result of the acceleration by the inertial sensor, since errors by double integration are accumulated, the estimation accuracy degrades as the time elapses after start of measurement.

In the present embodiment, there is no necessity that capturing of an image is normally performed as described above. On the other hand, if an imaging timing comes, then estimation of the position based on a captured image can be performed, and errors accumulated by the position estimation based on a measurement result of the acceleration by the inertial sensor can be eliminated depending upon a result of the estimation. In this manner, according to the present invention, the position of the tracker 12 can be estimated with high accuracy while the power consumption is reduced.

In the following, functions of the tracker 12 according to the present embodiment and processes executed by the tracker 12 are described further.

Figure 4:
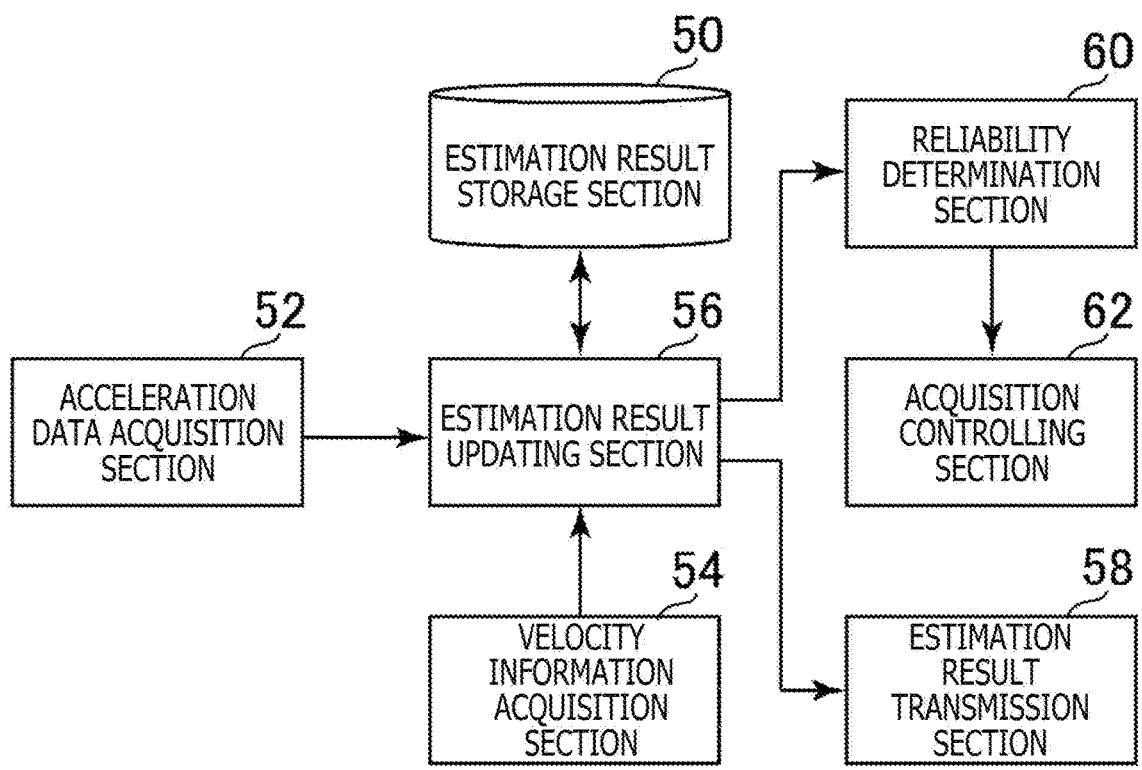
FIG. 4 is a functional block diagram depicting an example of functions implemented in the tracker according to the embodiment of the present invention.

FIG. 4 is a functional block diagram depicting an example of the functions implemented in the tracker 12 according to the present embodiment. It is to be noted that all of the functions depicted in FIG. 4 need not be implemented in the tracker 12 according to the present embodiment and functions other than the functions depicted in FIG. 4 may be implemented in the tracker 12.

As depicted in FIG. 4, the tracker 12 functionally includes, for example, an estimation result storage section 50, an acceleration data acquisition section 52, a velocity information acquisition section 54, an estimation result updating section 56, an estimation result transmission section 58, a reliability determination section 60, and an acquisition controlling section 62. The estimation result storage section 50 implements the storage section 32 as a main component therein. The acceleration data acquisition section 52, the velocity information acquisition section 54, and the acquisition controlling section 62 implement the processor 30 and the sensor section 40 as principal components therein. The estimation result updating section 56 and the reliability determination section 60 implements the processor 30 as a principal component therein. The estimation result transmission section 58 implements the communication section 34 as a principal component therein.

The functions described may be implemented by execution by the processor 30 of a program installed in the tracker 12, which is a computer, and including instructions corresponding to the functions described above. This program may be supplied to the tracker 12 through a computer-readable information recording medium such as, for example, an optical disk, a magnetic disk, a magnetic tape, a magneto-optical disk, or a flash memory or through the Internet or the like.

The estimation result storage section 50 stores, in the present embodiment, for example, an estimation result of the position of the tracker 12. Further, the estimation result storage section 50 may store an estimation result of the velocity of the tracker 12. For example, the estimation result storage section 50 may store estimation result data described hereinabove.

The acceleration data acquisition section 52 repetitively acquires acceleration data indicative of the acceleration of the tracker 12, for example, from the sensor for detecting the acceleration of the tracker 12. In the example described above, acceleration data is acquired repeatedly at intervals of 8 milliseconds.

The velocity information acquisition section 54 acquires, in the present embodiment, for example, information of the velocity of the tracker 12. Here, for example, the velocity information acquisition section 54 may acquire, from a camera that captures an image at every sequentially coming imaging timing, the image. Here, the imaging timing may come after every 1000 milliseconds as described hereinabove. Then, when an imaging timing comes, two images captured at the imaging timing may be acquired from the camera. Then, the velocity information acquisition section 54 may generate information of the velocity of the tracker 12 on the basis of a difference between the two images and acquire information of the velocity.

Further, the information of the velocity acquired by the velocity information acquisition section 54 is not limited to that based on the difference between two images. For example, the velocity information acquisition section 54 may acquire a measurement result by a velocity sensor using a laser or the like as information of the velocity of the tracker 12. Further, for example, the velocity information acquisition section 54 may estimate the velocity of the tracker 12 on the basis of blur of a picture appearing on an image captured by the camera having an exposure time period set long. Then, the velocity information acquisition section 54 may generate information indicative of the velocity and acquire the generated information. In the following description, information to be made a basis of generation of information of a velocity to be acquired by the velocity information acquisition section 54 such as a difference between two images, a measurement result of a velocity sensor, and an image captured by a camera having an exposure time period set long is hereinafter referred to as velocity basic information. It is to be noted that, as another example of the velocity basic information, information outputted from an event driven camera that issues, when a movement of an imaging target is detected, a notification of information representative of the movement, a measurement result of ultrasonic waves or radio waves and so forth are available.

The estimation result updating section 56 updates, in the present embodiment, for example, on the basis of an estimation result of the position of the tracker 12 stored in the estimation result storage section 50 and the acquired latest acceleration data, the estimation result. Here, the estimation result updating section 56 may generate new estimation result data on the basis of the estimation result data stored in the estimation result storage section 50 and the acquired latest acceleration data. Then, the estimation result updating section 56 may update the estimation result data stored in the estimation result storage section 50 to the generated new estimation result data.

Here, it is assumed that, for example, information of a velocity of the tracker 12 is acquired by the velocity information acquisition section 54. At this time, the estimation result updating section 56 may generate new estimation result data on the basis of the information of the velocity of the tracker 12 acquired by the velocity information acquisition section 54 and the acquired latest acceleration data. Then, the estimation result updating section 56 may update the estimation result data stored in the estimation result storage section 50 to the generated new estimation result data.

Further, the estimation result updating section 56 may estimate the position of the tracker 12 on the basis of at least one of two images acquired by the velocity information acquisition section 54. In the example described above, the position of the tracker 12 is estimated using the SLAM technology. Then, the estimation result updating section 56 may generate new estimation result data on the basis of the position of the tracker 12 estimated on the basis of the image and the acquired latest acceleration data. Then, the estimation result updating section 56 may update the estimation result data stored in the estimation result storage section 50 to the generated new estimation result data.

The estimation result transmission section 58 transmits, in the present embodiment, for example, an estimation result of the position of the tracker 12 to the entertainment apparatus 14. Here, the estimation result transmission section 58 may transmit not only an estimation result of the position of the tracker 12 but also, for example, an estimation result of the velocity of the tracker 12 or a measurement result of the acceleration of the tracker 12.

The entertainment apparatus 14 may execute various processes such as a game process according to the received estimation result or cause an image according to a result of the processes to be displayed on the display 18.

The reliability determination section 60 determines in the present embodiment, for example, a reliability degree of the information of the velocity of the tracker 12 acquired by the velocity information acquisition section 54. For example, when the position of the tracker 12 is estimated using the SLAM technology, the reliability degree may be determined such that it is made higher when the velocity information acquisition section 54 succeeds in matching between the acquired image and an environmental map than when the velocity information acquisition section 54 does not succeed in the matching. Further, the reliability degree may be determined such that, for example, it is made higher in the case where the luminance of the image acquired by the velocity information acquisition section 54 is high than in the case where the luminance is low. Further, the reliability degree may be determined such that, for example, it is made higher in the case where the image acquired by the velocity information acquisition section 54 is not blurred than in the case where the image is blurred. Further, the reliability degree may be determined such that, for example, it is made higher in the case where an intensity of a signal accepted by the velocity sensor for measuring the velocity is high than in the case where the intensity is low.

The acquisition controlling section 62 controls, in the present embodiment, for example, the number of times by which the velocity information acquisition section 54 is to acquire information of the velocity per unit time on the basis of the reliability degree of information of the velocity determined by the reliability determination section 60. Here, for example, the acquisition controlling section 62 may control the number of times by which the velocity information acquisition section 54 is to acquire information of the velocity per unit time so as to decrease in the case where the reliability degree of information of the velocity is high from that in the case where the reliability degree is low. This makes it possible to further decrease the power consumption in the case where the reliability degree of information of the velocity is high.

Figure 5:
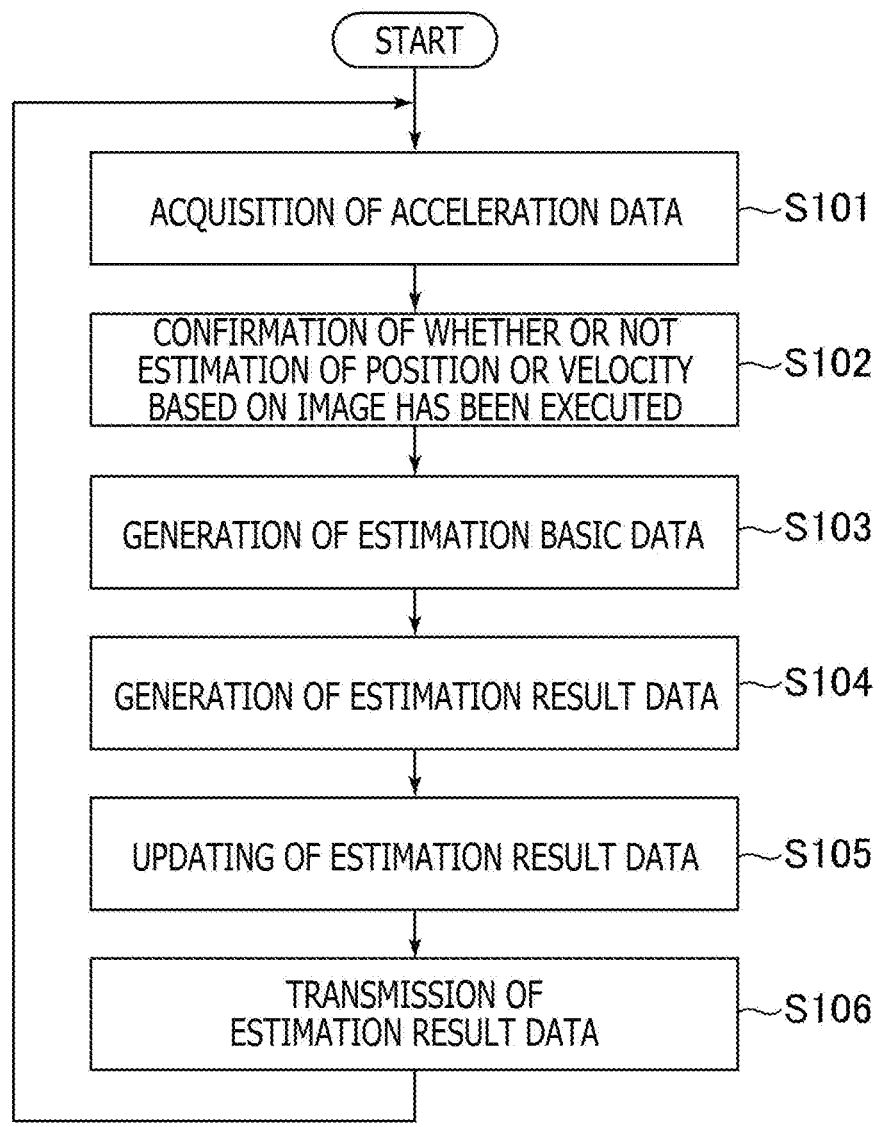
FIG. 5 is a flow chart depicting an example of a flow of processing performed by the tracker according to the embodiment of the present invention.

Here, an example of a flow of processing performed by the tracker 12 according to the present embodiment is described with reference to a flow chart exemplified in FIG. 5. In the present processing example, the following processes indicated in S101 to S106 are executed repeatedly at predetermined time intervals (here, for example, at intervals of 8 milliseconds). Note that it is assumed that, when an imaging timing comes asynchronously with the processing exemplified in FIG. 5, capturing of an image by the camera, acquisition of the image, and estimation of the position and the velocity based on the captured image are executed in parallel. Further, it is assumed that, in the following processing example, estimation result data including a combination of a value x(t) and a value v(t) are generated by the processing in the present cycle.

First, the acceleration data acquisition section 52 acquires acceleration data indicative of an acceleration of the tracker 12 in the present cycle (S101).

Then, the estimation result updating section 56 confirms whether or not estimation of the position or the velocity based on the image acquired by the velocity information acquisition section 54 has been executed in the present cycle (S102).

Then, the estimation result updating section 56 generates estimation basic data on the basis of a result of the conformation in the process depicted in S102 (S103).

Here, for example, in the case where estimation of any of the position and the velocity based on the image acquired by the velocity information acquisition section 54 has not been executed, estimation basis data including a combination of a value x(t-8), a value v(t-8), and a value a(t) is generated. On the other hand, in the case where estimation of the position based on the image acquired by the velocity information acquisition section 54 has been executed, estimation basic data including a combination of a value xp(t-8), a value v(t-8), and a value a(t) is executed. Meanwhile, in the case where estimation of the velocity based on the image acquired by the velocity information acquisition section 54 has been executed, estimation basic data including a combination of a value x(t-8), a value vp(t-8), and a value a(t) is generated. It is to be noted that estimation basic data including a combination of a value xp(t-8), a value vp(t-8), and a value a(t) may be generated here.

Then, the estimation result updating section 56 generates new estimation result data on the basis of the estimation basic data generated by the process indicated in S103 (S104). Here, estimation result data including a combination, for example, of a value x(t) and a value v(t) is generated.

Then, the estimation result updating section 56 updates the estimation result data stored in the estimation result storage section 50 to the estimation result data generated by the process indicated in S104 (S105).

Then, the estimation result transmission section 58 transmits the estimation result data generated by the process indicated in S104 to the entertainment apparatus (S106) and the processing returns to the process indicated in S101.

It is to be noted that the present invention is not limited to the embodiment described above.

For example, part or all of the functions depicted in FIG. 4 may be implemented in the entertainment apparatus 14 or the relay apparatus 16.

Further, for example, the image base estimation section 56 may execute estimation of the position or the velocity of the tracker 12 on the basis of an image captured by the camera 20a included in the camera and microphone unit 20.

Further, for example, the inertial sensor may further detect the angular velocity of the tracker 12. Then, the velocity information acquisition section 54 may acquire information of the velocity according to the angular velocity detected by the inertial sensor. For example, the velocity information acquisition section 54 may generate information of the velocity of the tracker 12 on the basis of the velocity basic information described hereinabove and the angular velocity of the tracker 12 detected by the inertial sensor. Then, the velocity information acquisition section 54 may acquire information of the velocity.

For example, it is assumed that, when an imaging timing comes, the velocity information acquisition section 54 acquires two images captured at the imaging timing from the camera. In this case, the velocity information acquisition section 54 may generate information of a velocity of the tracker 12 on the basis not only of the difference between the two images but also of the angular velocity of the tracker 12 at the imaging timing detected by the inertial sensor. Then, the velocity information acquisition section 54 may acquire information of the velocity.

In the velocity basic information, information corresponding to a velocity and information corresponding to an angular velocity sometimes appear in a mixed manner. Generally, an inertial sensor can measure an angular velocity with high accuracy. Therefore, it sometimes occurs that the angular velocity measured by the inertial sensor represents the angular velocity of the tracker 12 with a higher degree of accuracy than that of information corresponding to the angular velocity appearing in the velocity basic information.

For example, by doing the above based on this, it can be expected that the velocity of the tracker 12 can be estimated with a higher degree of accuracy on the basis of the velocity basic information. Here, for example, information of the velocity of the tracker 12 may be generated using a measurement result of the angular velocity of the tracker 12 by the inertial sensor in place of information corresponding to an angular velocity appearing in the velocity basic information. Then, by generating estimation result data including the combination of the value x(t) and the value v(t) described hereinabove on the basis of information of the velocity generated in this manner, the estimation accuracy of the velocity or the position of the tracker 12 is improved.

Further, the particular character strings and numerical values described above and particular character strings and numerical values in the drawings are exemplary, and the character strings and the numerical values are not restrictive.

The invention claimed is:

1. A position estimation apparatus, comprising:
    an estimation result storage section configured to store a result of estimation of a position of a tracker;
    an acceleration data acquisition section configured to repeatedly acquire acceleration data indicative of an acceleration of the tracker from a sensor that detects an acceleration of the tracker;
    an estimation result updating section configured to update the result of estimation on a basis of the result of estimation of the position of the tracker stored in the estimation result storage section and the acquired latest acceleration data;
    a velocity information acquisition section configured to acquire information of a velocity of the tracker, wherein
    the estimation result updating section updates, when the velocity information is acquired by the velocity information acquisition section, the estimation result of a position of the tracker stored in the estimation result storage section on a basis of the velocity information and the acquired latest acceleration data;
    a reliability determination section configured to determine a reliability degree of the velocity information to be acquired by the velocity information acquisition section; and
    an acquisition controlling section configured to control a number of times at which the velocity information acquisition section is to acquire the velocity information per unit time on a basis of the reliability degree.

2. The position estimation apparatus according to claim 1, wherein
    the velocity information acquisition section acquires two images from a camera that captures the two images for each successively arriving capturing timing, and
    the estimation result updating section updates, when the two images are acquired by the velocity information acquisition section, the estimation result of a position of the tracker stored in the estimation result storage section on a basis of the velocity of the tracker estimated on a basis of the two images and the acquired latest acceleration data.

3. The position estimation apparatus according to claim 2, wherein the estimation result updating section updates, when the two images are acquired by the velocity information acquisition section, the estimation result of a position of the tracker stored in the estimation result storage section on a basis of a position of the tracker estimated based on at least one of the two images and the acquired latest acceleration data.

4. The position estimation apparatus according to claim 1, wherein
the sensor further detects an angular velocity of the tracker, and
the velocity information acquisition section acquires the velocity information according to the angular velocity of the tracker detected by the sensor.

5. A position estimation method, comprising:
repeatedly acquiring acceleration data indicative of an acceleration of a tracker from a sensor that detects an acceleration of the tracker;
updating a result of estimation on a basis of a result of estimation of a position of the tracker stored in an estimation result storage section that stores a result of estimation of the position of the tracker therein and the acquired latest acceleration data; and
acquiring information of a velocity of the tracker, wherein,
when the velocity information is acquired in the acquiring the velocity information, in the updating the estimation result, an estimation result of a position of the tracker stored in the estimation result storage section on a basis of the velocity information and the acquired latest acceleration data;
determining a reliability degree of the velocity information; and
controlling a number of times at which the velocity information is acquired per unit time on a basis of the reliability degree.

6. A non-transitory computer readable medium having stored thereon a program for a computer, comprising:
by an acceleration data acquisition, repeatedly acquiring acceleration data indicative of an acceleration of a tracker from a sensor that detects an acceleration of the tracker;
by an estimation result updating section, updating a result of estimation on a basis of a result of estimation of a position of the tracker stored in an estimation result storage section that stores a result of estimation of the position of the tracker therein and the acquired latest acceleration data;
by a velocity information acquisition section, acquiring information of a velocity of the tracker, wherein,
when the velocity information is acquired in the acquiring the velocity information, in the updating the estimation result, an estimation result of a position of the tracker stored in the estimation result storage section on a basis of the velocity information and the acquired latest acceleration data,
by a reliability determination section, determining a reliability degree of the velocity information to be acquired by the velocity information acquisition section; and
by an acquisition controlling section, controlling the number of times at which the velocity information acquisition section is to acquire the velocity information per unit time on a basis of the reliability degree.

* * * * *